US009876717B2

(12) United States Patent
Alkhatib et al.

(10) Patent No.: US 9,876,717 B2
(45) Date of Patent: *Jan. 23, 2018

(54) DISTRIBUTED VIRTUAL NETWORK GATEWAYS

(71) Applicant: MICROSOFT TECHNOLOGY LICENSING, LLC, Redmond, WA (US)

(72) Inventors: Hasan Alkhatib, Kirkland, WA (US); Geoff Outhred, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/657,957

(22) Filed: Mar. 13, 2015

(65) Prior Publication Data
US 2015/0188818 A1    Jul. 2, 2015

Related U.S. Application Data

(63) Continuation of application No. 13/749,847, filed on Jan. 25, 2013, now Pat. No. 8,982,890, which is a
(Continued)

(51) Int. Cl.
*H04L 12/741* (2013.01)
*H04L 29/12* (2006.01)
(Continued)

(52) U.S. Cl.
CPC ........ *H04L 45/745* (2013.01); *H04L 12/4641* (2013.01); *H04L 12/66* (2013.01);
(Continued)

(58) Field of Classification Search
CPC ........... H04L 29/12339; H04L 12/4641; H04L 12/66; H04L 45/02; H04L 45/74; H04L 49/70; H04L 61/15
(Continued)

(56) References Cited

U.S. PATENT DOCUMENTS

| 6,434,627 B1 | 8/2002 | Millet et al. |
| 6,697,872 B1 | 2/2004 | Moberg et al. |

(Continued)

FOREIGN PATENT DOCUMENTS

| CN | 1340260 A | 3/2002 |
| EP | 1748600 A1 | 1/2007 |

(Continued)

OTHER PUBLICATIONS

"Second Office Action Issued in Chinese Patent Application No. 201180030856.8", dated Jun. 10, 2015, 6 Pages.
(Continued)

*Primary Examiner* — Afshawn Towfighi
*Assistant Examiner* — Mewale Ambaye
(74) *Attorney, Agent, or Firm* — Shook, Hardy & Bacon L.L.P.

(57) ABSTRACT

Computerized methods, systems, and computer-readable media are provided for distributing virtualized gateway functionality to multiple nodes within a physical network. Initially, drivers that carry out the gateway functionality are provisioned to cooperate with endpoints instantiated on the network nodes, while a directory service is implemented to maintain a mapping between virtual internet protocol (IP) addresses and location-dependent addresses, as well as a table enumerating transformation actions according to known pathways connecting the endpoints within a network. In operation, the directory service replies to requests from the driver (carrying source and destination IP addresses of data packets) with the appropriate location-dependent addresses (utilizing the mapping) and the appropriate transformation action(s) (utilizing the table). The transformation action(s) include rewriting headers of the data packets to include the location-dependent addresses, encapsulating the data packets as inner data packets within respective outer
(Continued)

data packets, or configuring the data packets with a tunneling protocol.

20 Claims, 5 Drawing Sheets

Related U.S. Application Data continuation of application No. 12/820,896, filed on Jun. 22, 2010, now Pat. No. 8,374,183.

(51) Int. Cl.
    *H04L 12/46*     (2006.01)
    *H04L 12/66*     (2006.01)
    *H04L 12/751*     (2013.01)
    *H04L 12/931*     (2013.01)

(52) U.S. Cl.
    CPC .. *H04L 29/12047* (2013.01); *H04L 29/12339* (2013.01); *H04L 45/02* (2013.01); *H04L 45/74* (2013.01); *H04L 49/70* (2013.01); *H04L 61/15* (2013.01); *H04L 61/2007* (2013.01); *H04L 61/2503* (2013.01)

(58) Field of Classification Search
    USPC .......................................................... 370/392
    See application file for complete search history.

(56) References Cited

U.S. PATENT DOCUMENTS

| | | | |
|---|---|---|---|
| 6,735,187 | B1 | 5/2004 | Helander et al. |
| 7,280,530 | B2 | 10/2007 | Chang et al. |
| 7,593,346 | B2 | 9/2009 | McLaggan et al. |
| 7,697,501 | B2 * | 4/2010 | O'Neill ................. H04L 45/58 370/349 |
| 7,768,913 | B1 | 8/2010 | Shepherd et al. |
| 7,840,701 | B2 | 11/2010 | Hsu et al. |
| 7,921,458 | B2 | 4/2011 | Hara et al. |
| 2002/0031131 | A1 * | 3/2002 | Yemini ............. H04L 29/12009 370/401 |
| 2002/0083199 | A1 | 6/2002 | Dingsor et al. |
| 2003/0009547 | A1 | 1/2003 | Benfield et al. |
| 2004/0162914 | A1 * | 8/2004 | St. Pierre .......... H04L 29/12009 709/245 |
| 2004/0249974 | A1 * | 12/2004 | Alkhatib ........... H04L 29/12349 709/245 |
| 2005/0207421 | A1 | 9/2005 | Suzuki |
| 2006/0090074 | A1 | 4/2006 | Matoba |
| 2006/0234636 | A1 | 10/2006 | Miller et al. |
| 2007/0280243 | A1 * | 12/2007 | Wray .................. H04L 12/4633 370/392 |
| 2008/0240122 | A1 | 10/2008 | Richardson et al. |
| 2009/0144817 | A1 | 6/2009 | Kumar et al. |

FOREIGN PATENT DOCUMENTS

| | | |
|---|---|---|
| JP | 2004264911 A | 9/2004 |
| JP | 2007180963 A | 7/2007 |
| JP | 2007-306251 A | 11/2007 |
| TW | I310275 B | 5/2009 |

OTHER PUBLICATIONS

Inter Domain Policy Routing: Overview of Architecture and Protocols—Published Date: 2005.
Virtual Gateways in the DECOS Integrated Architecture—Published Date: 2005.
Reliability and Load Handling Problem in Internet Service Provider's Network—Published Date: Jun. 2009.
RFC1478—An Architecture for Inter-Domain Policy Routing—Published Date: Jun. 1993.
International Search Report with Written Opinion dated Feb. 17, 2012 in Application No. PCT/US2011/039324, 10 pages.
Non Final Office Action dated Apr. 9, 2012 in U.S. Appl. No. 12/820,896, 14 pages.
Notice of Allowance dated Oct. 10, 2012 in U.S. Appl. No. 12/820,896, 9 pages.
Non Final Office Action dated May 23, 2014 in U.S. Appl. No. 13/749,847, 7 pages.
Notice of Allowance dated Oct. 27, 2014 in U.S. Appl. No. 13/749,847, 8 pages.
"First Office Action and Search Report Issued in Chinese Patent Application No. 201180030856.8", dated Oct. 8, 2014, 12 Pages.
"Office Action Issued in Japanese Patent Application No. 2013-516590", dated Apr. 22, 2015, 4 Pages.
"Office Action Issued in Taiwan Patent Application No. 100117829", dated Sep. 7, 2015, 7 Pages.
"Supplementary Search Report Issued in European Patent Application No. 11798589.5", dated Aug. 18, 2017, 7 Pages.

* cited by examiner

DISTRIBUTED VIRTUAL NETWORK GATEWAYS

CROSS-REFERENCE TO RELATED APPLICATIONS

This application is a continuation of U.S. application Ser. No. 13/749,847, filed Jan. 25, 2013, now U.S. Pat. No. 8,982,890, Issued Mar. 17, 2015, titled "Distributed Virtual Network Gateways", which is a continuation of U.S. application Ser. No. 12/820,896, filed Jun. 22, 2010, now U.S. Pat. No. 8,374,183, Issued Feb. 12, 2013, titled "Distributed Virtual Network Gateways", which is herein incorporated by reference.

BACKGROUND

Large-scale networked systems are commonplace platforms employed in a variety of settings for running service applications and maintaining data for business and operational functions. For instance, a data center (e.g., physical cloud computing infrastructure) may provide a variety of services (e.g., web applications, email services, search engine services, etc.) for a plurality of customers simultaneously. These large-scale networked systems typically include a large number of resources distributed throughout the data center, in which each resource resembles a physical machine or a virtual machine (VM) running on a physical host. When the data center hosts multiple tenants (e.g., customer programs), these resources are allocated from the data center to the different tenants to meet their usage requirements. The set of resources allocated to a tenant can be grouped in a logical or virtual subnet for ease of management and security isolation.

Customers of the data center often require service applications running in an enterprise private network (e.g., server managed by a customer that is geographically remote from the data center) or other third-party network to interact with the software being run on the resources in the data center. To implement this interaction while separating the resources allocated to a tenant securely from resources allocated to other tenants, a hosting service provider may employ a single, centralized routing mechanism to serve as a network gateway among all machines belonging to a tenant within a virtual subnet, or resources managed by a host hypervisor and the tenant's remote resources. However, this architecture of employing the centralized routing mechanism is ineffective because operation depends on the mechanism's physical proximity to the machines/resources it is serving. For instance, if the machines/resources are in different parts of the data center or in different locations (e.g., spanning the data center and enterprise private network), then at least some machines/resources will be faced with higher latency and a lower bandwidth connection with the driver while being utilized by other machines/resources. Thus, the centralized routing mechanism becomes a common congestion point for communications entering and exiting a particular virtual subnet. Further, the machines/resources will be forced to transmit data packets over suboptimal routes when confined to passing all communications through this centralized routing mechanism.

As such, employing emerging technologies to distribute virtual network gateways, or drivers, throughout a data center by embedding the drivers within physical machines (incorporating into the local machine network stack) or virtual machines (incorporating into the virtual switch network stack) will enhance the transmission of data packets by discovering and utilizing optimal network pathways, reduce network congestion by distributing gateway functionality, and serve to further isolate the communications of the data-center customers.

SUMMARY

This Summary is provided to introduce concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention provide an architecture of distributed virtual network gateways that addresses the issues described above. These gateways may take the form of drivers that can be provisioned throughout a data center by embedding the drivers within physical machines (incorporating into the local machine network stack) or virtual machines (incorporating into the virtual switch network stack). As will be described in detail below, the drivers enhance the transmission of data packets by discovering and utilizing optimal network pathways, reduce network congestion by distributing gateway functionality, and serve to further isolate the communications of the data-center customers. Further, the drivers protect the integrity of a customer's service application running in a cloud computing platform, which is configured to allow multiple tenants (e.g., tens of thousands per cloud) to share the computing resources in a cloud-service data center.

Generally, the drivers support selecting a most appropriate format and pathway of a communication between endpoints that are allocated to the service application, while virtually partitioning the allocated network adapters from other resources in a data center. By way of clarification, the endpoints may comprise network adapters instantiated on virtual machines (VMs) and/or physical machines. To achieve selection of the format and the pathway of data packets within the communication, in embodiments, the drivers reach out to directory services that assist the drivers in making routing decisions for their respective source and destination endpoints. Bolstered by information returned from the directory service, the drivers function to properly manage the routing of data packets therefrom and, at the same time, prevent unauthorized communications by properly transforming the data packets.

In an exemplary embodiment, the drivers serve to disperse virtualized gateway functionality to multiple virtualized endpoints of nodes within a physical network. Initially, the drivers are provisioned to cooperate with endpoints instantiated on the network nodes. Further, the directory service is implemented to maintain a mapping between virtual internet protocol (IP) addresses and location-dependent addresses, as well as a table enumerating transformation actions according to known pathways connecting the endpoints within a network. Each of the drivers is capable of communication with the directory service, when removed from the drivers at a central location, or locally accessing the directory service, when incorporated within the drivers internally.

In operation, a recipient endpoint, which is linked to a particular driver, may receive one or more data packets. The driver may read a header of the data packets to ascertain a source IP address and a destination IP address. The driver may further package the source and destination IP addresses within a request for routing information, and convey the request to the directory service, either internally or externally. The directory service may reply to the request from the driver with appropriate location-dependent addresses of a forwarding path by inspecting the mapping with source and destination IP addresses. In addition, the directory service may reply to the request with appropriate transformation action(s) by inspecting the table with the forwarding path. The transformation action(s) may include one or more of the following: rewriting headers of the data packets to include the location-dependent addresses, encapsulating the data packets as inner data packets within respective outer data packets that are structured with headers carrying the location-dependent addresses, or configuring the data packets with a tunneling protocol (e.g., per security policies of the data center or a service model established by a customer).

Upon receiving the routing information at the driver, the driver may deliver the forwarding path and the transformation action to the recipient endpoint. In turn, the recipient endpoint implements the forwarding path and applies the transformation action when transmitting the data packets therefrom. In other embodiments, the driver may perform the appropriate transformation action directly to the data packets rather than relying on an endpoint (e.g., the recipient endpoint) to perform that functionality.

Accordingly, upon the driver and directory service acting in concert to make an informed routing decision, the recipient endpoint linked to the driver may be provided with an optimal choice of network pathways, thereby reducing network congestion, and an appropriate transformation action, thereby enforcing isolation of transmissions outside the data center.

BRIEF DESCRIPTION OF THE DRAWINGS

Embodiments of the present invention are described in detail below with reference to the attached drawing figures, wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention relate to methods, computer systems, and computer-readable media for making informed routing decisions at distributed drivers that provide virtualized gateway functionality in a localized fashion.

In one aspect, embodiments of the present invention relate to one or more computer-readable media having computer-executable instructions embodied thereon that, when executed, perform a method for managing distribution of data packets between endpoints. In embodiments, the method includes the step of detecting one or more data packets at a first endpoint. Typically, each of the data packets includes a header comprising a source address and a destination address. A driver, which is associated with the first endpoint, may send a request to a directory service. In an exemplary embodiment, the request carries the source address and the destination address, or some indicia thereof. Upon receiving the request, the directory service performs a lookup to translate the source address and the destination address into a forwarding path and a transformation action. The forwarding path and the transformation action may be sent from directory service within a response to the driver. However, the driver and/or the endpoints also maintain the ability to drop one or more of the data packets that fail to match a rule in the directory service related to origination, recipient and target endpoints. This ability to drop data packets provides the driver with the authority to enforce isolation within the network.

Upon receipt of the response, the driver may perform a routing decision that is based, in part, on whether the first endpoint is an origination endpoint of the data packets, a recipient endpoint that acts to forward the data packets onto a target endpoint, or the target endpoint. When the first endpoint represents the origination endpoint (identified by the source address), the routing decision may result in one or more of the following transformation actions: (a) rewriting the header of the data packets to include the location-dependent addresses; (b) encapsulating the data packets as inner data packets within respective outer data packets, where the outer data packets each include a header that carries the location-dependent addresses; or (c) configuring the data packets with a tunneling protocol. When the first endpoint represents the recipient endpoint, the routing decision may result in one or more of the following transformation actions: (a) forwarding the encapsulated data packets or data packets with the rewritten header over another network pathway; (b) redirecting the encapsulated data packets or data packets with the rewritten header through a tunnel; or (c) removing the tunneling protocol from the data packets. When the first endpoint represents the target endpoint (identified by the destination address), the routing decision may result in one or more of the following transformation actions: (a) decapsulating the encapsulated data packets; (b) restoring the headers of data packets that were rewritten; or (c) removing the tunneling protocol from the data packets to prepare for consumption.

In another aspect, embodiments of the present invention relate to a computer system for supporting and isolating communications between endpoints. Initially, the computer system includes a directory service, a first endpoint, a second endpoint, and a driver that is provisioned locally to first endpoint. Generally, the directory service maintains a mapping between virtual internet protocol (IP) addresses and location-dependent addresses of a physical network. In operation, first endpoint may commence generating one or more data packets structured with headers that include a source IP address and a destination IP address. In this instance, the source IP address points to the first (origination) endpoint, and the destination IP address points to the second (target) endpoint.

Upon detecting that the first endpoint is attempting to transmit the data packets from a node (e.g., physical machine or virtual machine) to the second endpoint, the driver performs a routing decision. In an exemplary embodiment, a distinct routing decision is invoked and carried out by the driver for each connection made by the first endpoint. In embodiments, performing the routing decision involves, but is not limited to, the following steps: communicating with the directory service to determine a forwarding path and a transformation action based on, in part, the source IP address and the destination IP address; determining whether the first endpoint and the second endpoint reside within a common data center; and determining whether the second endpoint is unable to translate the headers of the data packets if the source IP address and the destination IP address are removed.

When it is determined that the first endpoint and the second endpoint reside within a common data center, the driver may rewrite the source IP address and the destination IP address with respective location-dependent addresses of the forwarding path. In another embodiment, the driver may encapsulate the data packets as inner data packets within respective outer data packets, which each include a header that exposes the location-dependent addresses of the forwarding path. There are several scenarios that invoke the transformation action of encapsulation. In one instance, encapsulation is triggered when it is determined that the second endpoint is unable to translate the headers of the data packets if the source address and the destination address are removed. Other potential scenarios where encapsulation may be required include (a) detecting some form of network translation (NAT) exists between the source and destination IP addresses, and/or (b) recognizing from the source and destination IP addresses that the first and second endpoints (e.g., origination and target network adapters) span multiple virtual networks such that there is no longer a one-to-one mapping from their location-dependent addresses and their virtual IP addresses.

When it is determined that the transformation action dictates a layer of protection to secure connectivity between the first endpoint and the second endpoint be provided, the driver may transform the data packets based on the received transformation action. In one instance, the transformation action involves applying tunneling protocol (e.g., secure socket tunneling protocol (SSTP) or internet protocol security (IPsec) to the data packets.

In yet another aspect, embodiments of the present invention relate to a computerized method for identifying a network pathway and transformation action in response to a request from a distributed, virtual network gateway. Initially, the method involves providing a directory service that maintains a mapping between virtual IP addresses and location-dependent addresses. The directory service may also maintain a table that recognizes an appropriate transformation action. In one instance, the table is designed according to communication policies that govern data-packet traffic across pathways that connect endpoints within a network. In another instance, the table is based upon a service model (e.g., service level agreement (SLA)) established for a customer of a data center hosting the customer's service application.

The method may further involve the step of receiving a request from a virtual network gateway in communication with a recipient endpoint. Typically, the request includes indicia of a source IP address and a destination IP address carried via a header of one or more data packets accepted by the recipient endpoint. Upon receipt of the request, the directory service may perform at least one of the following lookup procedures: inspect the mapping with the source IP address and the destination IP address to identify corresponding location-dependent addresses constituting a forwarding path of the data packets through a physical network; or inspect the table with the forwarding path to identify a corresponding transformation action. As more fully discussed below, the transformation action may involve, but is not limited to, one or more of the following: rewriting the header of the data packets to include the location-dependent addresses; encapsulating the data packets as inner data packets within respective outer data packets, which each include a header that carries the location-dependent addresses; or configuring the data packets with a tunneling protocol. Eventually, the directory service may return a response that delivers to the virtual network gateway indicia of the identified forwarding path and the identified transformation action.

Having briefly described an overview of embodiments of the present invention, an exemplary operating environment suitable for implementing embodiments of the present invention is described below.

Figure 1:
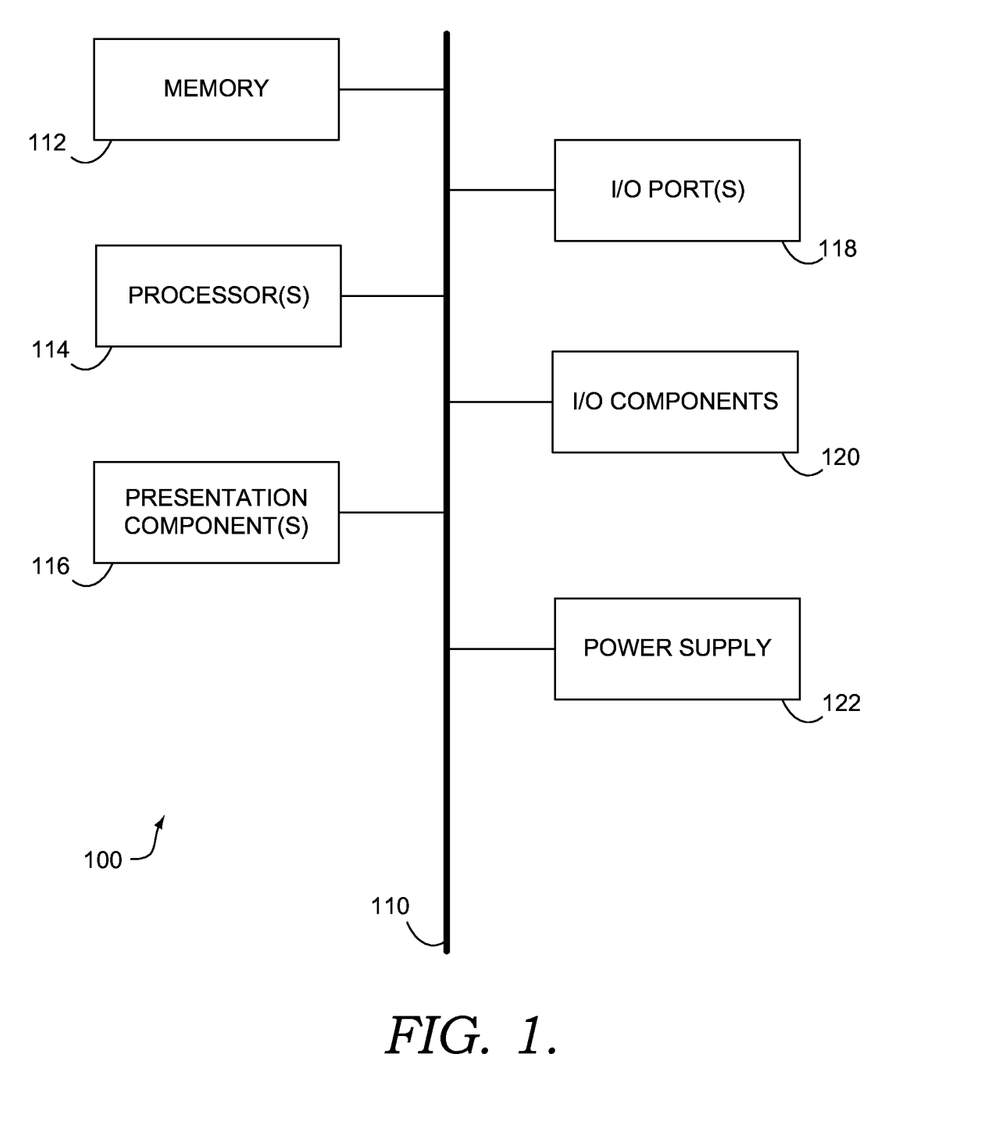
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of embodiments of the present invention. Neither should the computing environment 100 be interpreted as having any dependency or requirement relating to any one or combination of components illustrated.

Embodiments of the present invention may be described in the general context of computer code or machine-useable instructions, including computer-executable instructions such as program components, being executed by a computer or other machine, such as a personal data assistant or other handheld device. Generally, program components including routines, programs, objects, components, data structures, and the like refer to code that performs particular tasks, or implements particular abstract data types. Embodiments of the present invention may be practiced in a variety of system configurations, including handheld devices, consumer electronics, general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVDs) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc. I/O ports 118 allow computing device 100 to be logically coupled to other devices including I/O components 120, some of which may be built-in. Illustrative components include a microphone, joystick, game pad, satellite dish, scanner, printer, wireless device, etc.

Figure 2:
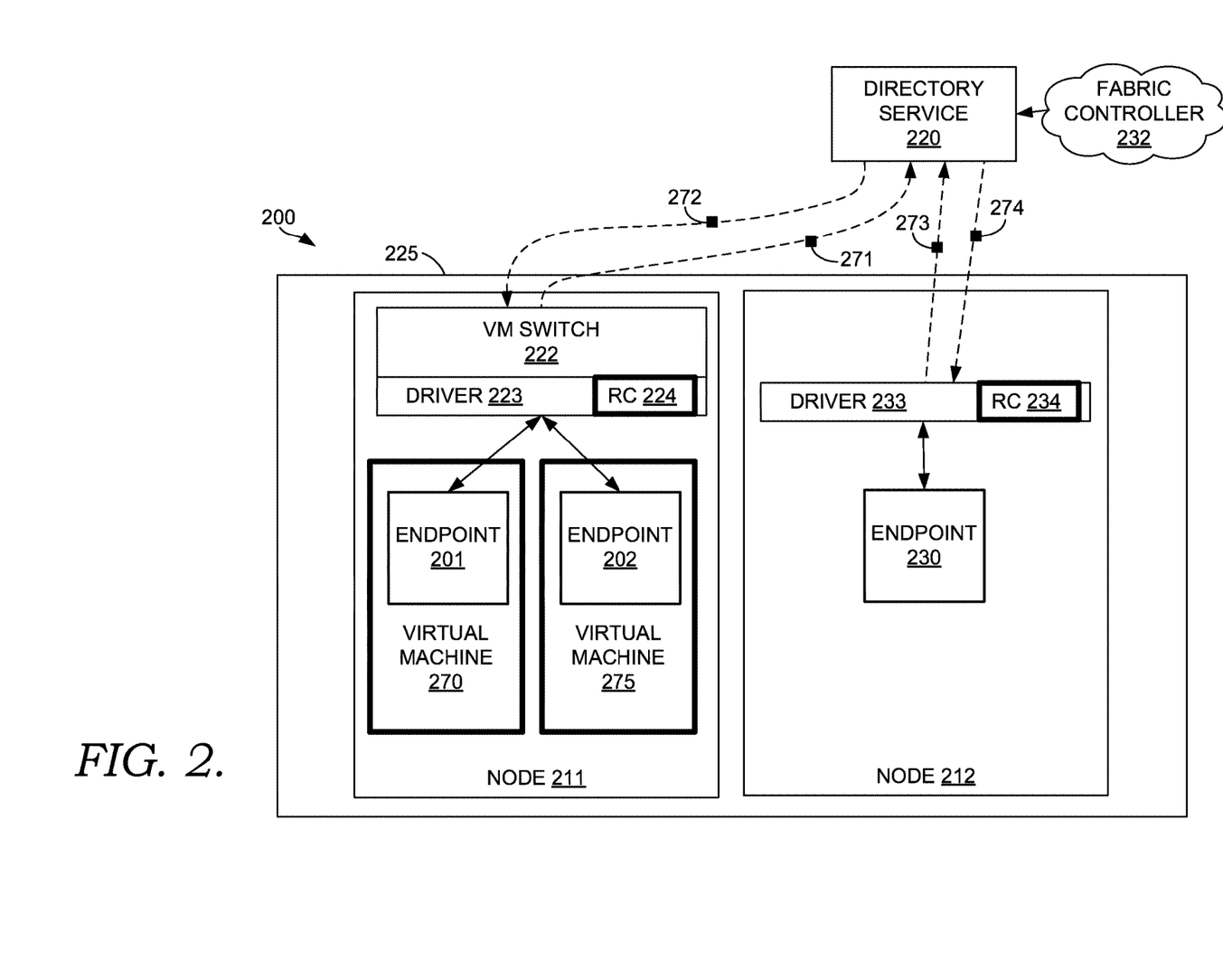
FIG. 2 is a block diagram illustrating an exemplary cloud computing platform, suitable for use in implementing embodiments of the present invention, that is configured to provision and facilitate operation of drivers within a data center.

With reference to FIGS. 1 and 2, a node 211 and a node 212 may be implemented by the exemplary computing device 100 of FIG. 1. Further, endpoints 201, 202, and 230 may access portions of the memory 112 of FIG. 1 and run on portions of the processors 114 of FIG. 1. Similarly, drivers 223 and 233, which embed the local gateway functionality within the virtual switch network stack of VM switch 222 (supporting the endpoints 201 and 202 on virtualized machines 270 and 275) and/or within the local machine network stack for physical machine(s) (supporting the endpoint 230), may access portions of the memory 112 of FIG. 1 and run on portions of the processors 114 of FIG. 1.

Turning now to FIG. 2, a block diagram is illustrated, in accordance with an embodiment of the present invention, showing an exemplary cloud computing platform 200 that is configured to perform routing decisions at the drivers 223 and 233 by employing routing information gathered from a directory service 220 using various forms of transformation. In embodiments, although illustrated as operable coupled to one cloud computing platform 200, the directory service 220 may exist outside the scope of a particular cloud (i.e., the directory service 220 may represent a cloud service shared across public and private cloud(s)). This ability to operate with various clouds allows the directory service to enable networks that span multiple clouds.

It will be understood and appreciated that the cloud computing platform 200 shown in FIG. 2 is merely an example of one suitable computing system environment and is not intended to suggest any limitation as to the scope of use or functionality of embodiments of the present invention. For instance, the cloud computing platform 200 may be a public cloud, a private cloud, or a dedicated cloud. Neither should the cloud computing platform 200 be interpreted as having any dependency or requirement related to any single component or combination of components illustrated therein. Further, although the various blocks of FIG. 2 are shown with lines for the sake of clarity, in reality, delineating various components is not so clear, and metaphorically, the lines would more accurately be grey and fuzzy. In addition, any number of physical machines, virtual machines, data centers, endpoints, or combinations thereof may be employed to achieve the desired functionality within the scope of embodiments of the present invention.

The cloud computing platform 200 may include one or more data centers (e.g., data center 225) that comprise nodes (e.g., nodes 211 and 212) for hosting service applications and other software. Per embodiments of the present invention, the nodes 211 and/or 212 may represent physical machines comprising any form of computing device, such as, for example, a personal computer, a desktop computer, a laptop computer, a mobile device, a consumer electronic device, server(s), the computing device 100 of FIG. 1, and the like. In another embodiment the nodes 211 and/or 212 may represent virtual machines or may provide the underlying support for operations of virtual machines, such as virtual machines 270 and 275. In operation, the virtual machines 270 and 275 support operation of tenants of the data center 225. As used herein, the term "tenants" generally refers to component programs (e.g., instances of various roles) of service applications owned by a customer of the cloud computing platform 200.

Generally, virtual machines 270 and 275 are allocated to the endpoints 201 and 202 of the service application based on demands (e.g., amount of processing load) placed on the service application. As used herein, the phrase "virtual machine" is not meant to be limiting, and may refer to any software, application, operating system, or program that is executed by a processing unit to underlie the functionality of the endpoints 201 and 202. In another embodiment, virtual machines refers to processing capabilities and memory resources carved out of a node for supporting tenants of the data center 225. In this way, the node 211 hosts and supports the operations of the virtual machines 270 and 275, while simultaneously hosting other virtual machines carved out for supporting other tenants of the data center 225, where the tenants include endpoints of other service applications owned by different customers. Accordingly, the virtual machines 270 and 275 may include processing capacity, storage locations, and other assets within the data center 225 to properly support the endpoints 201 and 202.

In operation, the virtual machines 270 and 275 are dynamically allocated within resources (e.g., node 211) of the data center 225, and endpoints (e.g., the endpoints 201 and 202) are dynamically placed on the allocated virtual machines 270 and 275 to satisfy the current processing load. In one instance, a fabric controller 232 is responsible for automatically allocating the virtual machines 270 and 275 and for placing the endpoints 201 and 202 within the data center 225. By way of example, the fabric controller 232 may rely on a service model (e.g., designed by a customer that owns the service application) to provide guidance on how and when to allocate the virtual machines 270 and 275 and to place the endpoints 201 and 202 thereon.

In one instance, the nodes 211 and 212 host support the operations of the endpoints 201, 202, and 230. The term "endpoints" is not meant to be limiting, but may encompass a program component of a service application (i.e., tenant of the data center 225) or network adapter running on a node, physical machine, or VM. In one aspect, the endpoints 201, 202, and 230 operate within the context of the cloud computing platform 200 and, accordingly, communicate internally through connections dynamically made therebetween. In another aspect, the endpoints 201, 202, and 230 communicate externally through a physical network topology to resources of a remote network (e.g., resource 375 of the enterprise private network 325 of FIG. 3). The external connections may further involve interconnecting to endpoints distributed across physical resources of the data center 225, via a network (not shown). In one embodiment, as illustrated by endpoint 230, the network directly interconnects these resources such that an origination endpoint (for generating data packets) may recognize a location of a recipient endpoint (for forwarding data packets to a target endpoint) or a location of the target endpoint (for consuming the data packets) in order to establish a communication therebetween. In another embodiment, the network indirectly interconnects the resources such that a packet of data addressed to endpoints 201 or 202, which are hosted on virtual machines 270 and 275 respectively, may be rerouted via the network and delivered to the VM switch 222 prior to being locally distributed to an appropriate endpoint residing on the same node. In addition, the network may establish a communication over channels (e.g., secure tunnel), thereby implementing an additional layer of protection or employing standard security measures to connections between the endpoints of the service application(s). By way of example, the channels may include, without limitation, one or more local area networks (LANs) and/or wide area networks (WANs). Such networking environments are commonplace in offices, enterprise-wide computer networks, intranets, and the Internet. Accordingly, the network is not further described herein.

The cloud computing platform 200 includes the data center 225 configured to host and support operation of the endpoints 201, 202, and 230 allocated to a particular service application. The phrase "service application," as used herein, broadly refers to any software, or portions of software, that runs on top of, or accesses storage locations within, the data center 225, another data center within the cloud computing platform 200, resources in an enterprise private network (e.g., resource 375 of the enterprise private network 325 of FIG. 3) located on a customer's premise, and/or resources in a third-party network (e.g., resource 325 of the third-party network 335 of FIG. 3). As discussed above, the endpoints 201, 202, and 230 may represent portions of software, component programs, or instances of roles that participate in the service application(s). In another embodiment, the endpoints 201, 202, and 230 may represent stored data that is accessible to the service application. It will be understood and appreciated that the endpoints 201, 202, and 230 shown in FIG. 2 are merely an example of suitable parts to support the service application and are not intended to suggest any limitation as to the number, scope of use, or functionality of embodiments of the present invention.

Figure 3:
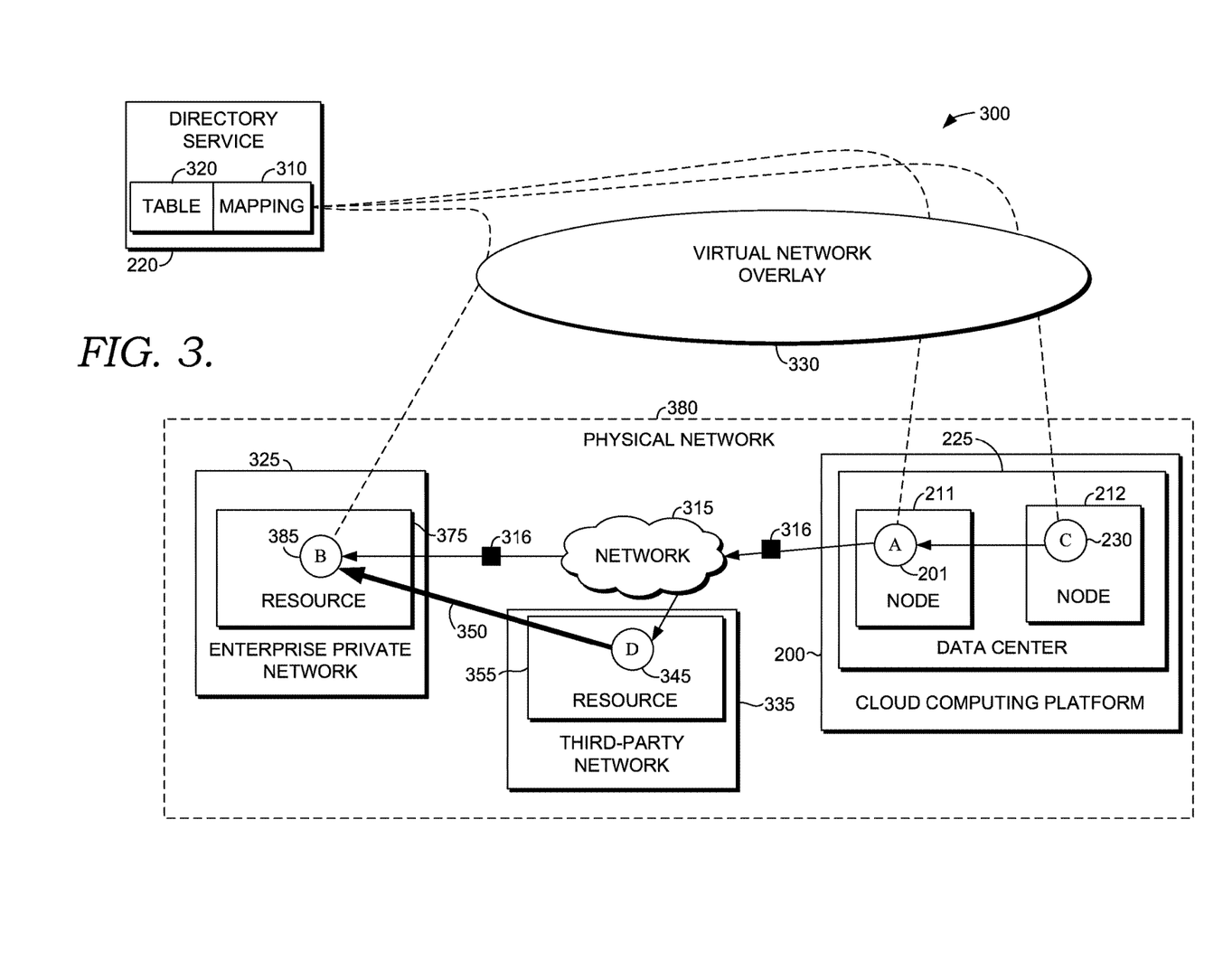
FIG. 3 is a schematic depiction of an exemplary architecture that resolves virtual network addresses into physical-network pathways and transformation actions, in accordance with an embodiment of the present invention.

Although one service application is described as being distributed over the two nodes 211 and 212 in a single data center 225, it should be understood and appreciated that any number of service applications residing on any number of nodes within various data centers or other suitable devices may be used, and that embodiments of the present invention are not limited to those nodes, service applications, and data center(s) described herein. Further, any number of endpoints may be instantiated within the nodes and/or allocated to the service application(s), and the endpoints illustrated in FIGS. 2 and 3 are shown for description purposes only.

In one instance, the architecture of the data center 225 allows a management system (e.g., fabric controller 232) or administrators of the cloud computing platform 200 to instantiate new endpoints or reallocate present endpoints to support a service application. The fabric controller 232 may also build up and take down network pathways and tunnels to connect the endpoints 201, 202, and 230. Further, the fabric controller 232 may periodically take snapshots of a topology of the data center 225. These snapshots may record presently established network pathways and tunnels through the data-center network and addresses of the endpoints. These snapshots may be relayed to a directory service 220 for storage therein. In embodiments, the directory service 220 may be configured to store the virtual IP addresses in association with location-dependent addresses of a physical network. Further, the directory service 220 may be configured to store transformation actions that are associated with respective network pathways and tunnels of the data-center network. In this way, the security policies of the service application's service model are enforced by the directory server 220 on data packets transmitted between tenants of the service application.

As discussed above, embodiments of the instant invention introduce an architecture that allow for communication between endpoints across a virtual layer (dashed lines) by utilizing network pathways and tunnels within the physical layer (solid lines). Within the physical layer, the endpoints are reachable via a network of links. Generally, it is preferable to intelligently select appropriate links of the network based on a location of interacting endpoints in order to avoid passing all communications through a centralized routing mechanism, thus, avoiding network congestion. To achieve intelligent selection of physical-layer links, as well as appropriate transformation of data packets traversing the selected links, in embodiments, the architecture is supported by two different technologies operating in concert: the drivers 223 and 233, and the directory service 220.

The drivers 223 and 233 are associated with one or more endpoints, and are embedded within the data center 225 as a function of a type of endpoint the driver is assisting. If endpoint (e.g., endpoint 230) is hosted on a physical machine (e.g., node 212), the driver 233 is implemented within the host switch (not shown) that places data packets directly into traffic between endpoints. In this embodiment, upon detecting one or more data packets reaching or leaving the endpoint 230, the driver 233 may solicit routing information by sending to the directory service 220 a request 273 that carries the source IP address and the destination IP address incorporated within a header of the data packets. Upon receiving the request 273 for routing information, the directory service 220 may reply with a response 274 that carries a forwarding path for the data packets and a transformation action appropriate for the forwarding path.

If the endpoint (e.g., endpoints 201 and 202) is hosted on a virtual machine (e.g., virtual machines 270 and 275), the driver (e.g., driver 223) is implemented within the network stack, hides all existing adaptors, and presents a single virtualized interface of the network. In this embodiment, the driver 223 may represent an independent VM switch or may be incorporated within an existing VM switch (e.g., VM switch 222). The VM switch 222, in embodiments, is provided to offer isolated connectivity between endpoints internal to and external of the data center 225, as more fully discussed with reference to FIG. 3. As used herein, the phase "virtual machine switch," or "VM switch," is not meant to be limiting, but may encompass any software-based component that resides within a data center, enterprise private network, third-party network, etc., and that is responsible for securely routing data packets across a network between endpoints of a service application. By way of example, the VM switch may be any network-edge device(s) (e.g., top rack switches, physical network interface cards in nodes, virtual interface cards in VMs, or a networking stack in non-virtualized hosts) that expose some application programming interface (API) for network management. In other examples, all or a portion of the operations carried out by the VM switch (e.g., communication with the directory service 220, encapsulation, decapsulation, modification of packets, and other actions) may be performed by a routing module. As such, the VM switch may embody one or more of routing module(s), network edge device(s), physical switch(es), routing device(s), and the like.

Similar to the driver 233, the driver 223 may, upon detecting one or more data packets reaching or leaving either of the endpoints 201 or 202, the driver 233 may solicit routing information by sending to the directory service 220 a request 271 that carries the source IP address and the destination IP address carried within a header of the data packets. Upon receiving the request 271 for routing information, the directory service 220 may reply with a response 272 that carries a forwarding path for the data packets and a transformation action appropriate for the forwarding path.

Referring now to FIGS. 2 and 3, additional interactions between the drivers 223 and 233, and the directory service 220, will now be discussed. As discussed above, drivers may be distributed on a multitude of nodes of the data center 225 and on resources outside the data center 225. The drivers 223 and 233 may be dynamically instantiated on, or torn down from, a node within the data center 225 as a function of one or more factors, such as a rate of IP traffic, a computing load consumed by tenants of the data center 225, and whether a node is being brought online or taken offline. In one embodiment, the fabric controller 232 is responsible for instantiating or tearing down VM switches.

In operation, the drivers 223 and 233 represent a virtual network adaptor for their respective nodes, and serve as a gateway to a particular endpoint within a service application or subnet. In this embodiment, a topology is provided where gateways make routing decisions regarding where, how, and what physical-layer links to use when transmitting data packet. By distributing the drivers across internal and external nodes, this gateway functionally is now virtualized and spread across the network.

In an exemplary embodiment, routing decisions help to determine a forwarding path that does not always require sending data packets through the centralized server. Further, the routing decisions can be specialized on a per connection/per machine basis. In one instance, a routing decision might determine to apply a highly-protective transformation action to data packets that employs secure tunnels linking endpoints spanning remote data centers. In another instance, a routing decision might determine to employ more lightweight transformation actions, such as encapsulation or rewriting headers of data packets when endpoints co-exist on a common secure network. In this instance, the endpoints may reside within the same subnet and may be visible to each other via a direct path between servers of a data-center network. Accordingly, the routing decision may leverage the ability of endpoints within the same subnet to use routes over physical-layer links that have no common congestion point in order to optimize their mutual connectivity. These and other routing decisions are described more fully with reference to FIG. 4.

In embodiments, routing/rewriting components (RCs) 224 and 234 are provided within the drivers 223 and 233, respectively. In operation, the RCs 224 and 234 are able to accept each data packet originated from an operating system of a node or endpoint, or transferred via a secure tunnel or network pathway, and to determine, based on contents (e.g., information carried within the header) of the data packets, a correct forwarding path and transformation action, if any. In one instance, the RCs 224 and 234 examine the source IP address and/or the destination IP address of each data packet it accepts and queries the directory service 220 for routing information (e.g., via the requests 271 and 273). The directory service 220 may answer the requests 271 and 273 with responses 272 and 274, respectively that may include various types of routing information. Accordingly, the RCs 224 and 234 are provisioned with the capability of managing multiple tunneling/rewriting protocols that are responsive to the routing information and that to support different forwarding processes for data packets.

Generally, the directory service 220 retains knowledge of the network 315, as well as the network pathways and secure tunnels 350 therein. By way of example, this knowledge includes information about the endpoints, what networks the endpoints reside within, what network pathways are established within those networks, what transformation actions are appropriate for specific forwarding paths across the network pathways, and how the transformation actions are performed. In operation, incident to the RCs 224 and 234 soliciting routing information, the directory service 220 may apply this network knowledge to inform a first endpoint how to reach a second endpoint within the network 315. To this end, the directory service 220 maintains a mapping 310 between virtual IP addresses and location-dependent addresses. In an exemplary embodiment, the mapping maintains one or more logical associations between interconnected endpoints and enforces access control associated with the endpoints in order to achieve network reachability. In one instance, the logical associations pertain to an association between endpoints that are members of a subnet.

The directory service 220 may also maintain a table 320 that recognizes an appropriate transformation action. In one instance, the table 320 is designed to enforce a communication policy, which is typically set in place by a customer via a service level agreement (SLA). In another instance, the communication policy is specifically designed for a service application and/or subnet and may include a list of permissions that governs which system processes are granted access to member endpoints of the subnet and whether the endpoints can be directly connected without involving a centralized routing device. In yet another instance, the communication policy may articulate what security levels are to be enforced for certain endpoints. In another instance, the communication policy serves as a security model that scans the mapping 310 for applicable entries upon receiving the request from the driver, and determines whether the raw-data transmission is authorized based on information within the applicable entries. In yet another instance, the communication policies may represent rules applied to a port number or a network adapter, which are available within a node of the data center 225, in order to ascertain whether the port number or network adapter is permitted to perform some operation Upon the directory service 220 receiving the request from a driver, the directory service 220 may perform the following lookup procedures: inspect the mapping 310 with the source IP address and the destination IP address to identify corresponding location-dependent addresses constituting a forwarding path of the data packets through a physical network 380; or inspect the table 320 with the forwarding path to identify a corresponding transformation action. In other words, the directory service receives a data set (Source IP address, Destination IP address) and, via translation against the mapping 310 and table 320, returns the data set (Forwarding path, Transformation Action). The return data set supports the routing-decision-making process within the requesting driver.

As more fully discussed below, the transformation action may involve, but is not limited to, one or more of the following: rewriting the header of the data packets to include the location-dependent addresses; encapsulating the data packets as inner data packets within respective outer data packets, which each include a header that carries the location-dependent addresses; or configuring the data packets with a tunneling protocol. Eventually, the directory service 220 may return a response that delivers to the requesting driver (virtual network gateway) indicia of the identified forwarding path and the identified transformation action.

Although depicted in FIGS. 2 and 3 as a single centralized server that pushes information to a requesting driver, the functionality of the directory service 220 may be implemented via local files federated and saved to a set of machines. Or, the functionality of the directory service 220 may be cached ahead of time at the requesting driver, if pushed out previously, eliminating the step of sending an external request.

Referring now to FIG. 3, a schematic depiction of an exemplary architecture of a distributed computing environment 300 that resolves virtual network addresses into physical-network pathways and transformation actions is shown, in accordance with an embodiment of the present invention. Initially, the distributed computing environment 300 includes a physical network 380 that includes an enterprise private network 325, a third-party network 335, and a cloud computing platform 200, as discussed with reference to FIG. 2. As used herein, the phrase "physical network" is not meant to be limiting, but may encompass tangible mechanisms and equipment (e.g., fiber lines, circuit boxes, switches, antennas, IP routers, and the like), as well as intangible communications and carrier waves, that facilitate communication between endpoints at geographically remote locations. By way of example, the physical network 380 may include any wired or wireless technology utilized within the Internet, or available for promoting communication between disparate networks.

Generally, the enterprise private network 325 includes resources, such as resource 375 that are managed by a customer of the cloud computing platform 200. Often, these resources host and support operations of components of the service application owned by the customer. Endpoint B 385 represents one or more of the components of the service application. In embodiments, resources, such as the virtual machine 270 of FIG. 2, are allocated within the data center 225 of FIG. 2 to host and support operations of remotely distributed components of the service application. Endpoints A 211 and C 212 represent two of these remotely distributed components of the service application. In operation, the endpoints A 211, B 385, and C 212 work in concert with each other to ensure the service application runs properly. In one instance, working in concert involves transmitting between the endpoints A 211, B 385, and C 212 data packets 316 across the network 315 of the physical network 380.

The third-party network 335 is also provided within the physical network 380. In embodiments, the third-party network 335 may refer to any other network that is not the enterprise private network 325 of FIG. 3 or the cloud computing platform 200. By way of example, the third-party network 335 may include a data store that holds information used by the service application, or a vendor that provides software to support one or more operations of the service application. In embodiments, the third-party network 335 represents a network of resources, including the resource 355 with an endpoint D 345 installed thereon, that is available to the cloud computing platform 200 of FIG. 6.

Typically, the resources 355 and 375, and the data center 225 include, or are linked to, some form of a computing unit (e.g., central processing unit, microprocessor, etc.) to support operations of the endpoint(s) and/or component(s) running thereon. As utilized herein, the phrase "computing unit" generally refers to a dedicated computing device with processing power and storage memory, which supports one or more operating systems or other underlying software. In one instance, the computing unit is configured with tangible hardware elements, or machines, that are integral, or operably coupled, to the resources 355 and 375, and the data center 225 to enable each device to perform a variety of processes and operations. In another instance, the computing unit may encompass a processor (not shown) coupled to the computer-readable medium accommodated by each of the resources 355 and 375, and the data center 225. Generally, the computer-readable medium stores, at least temporarily, a plurality of computer software components (e.g., the endpoints A 211, B 385, C 212, and D 345) that are executable by the processor. As utilized herein, the term "processor" is not meant to be limiting and may encompass any elements of the computing unit that act in a computational capacity. In such capacity, the processor may be configured as a tangible article that processes instructions. In an exemplary embodiment, processing may involve fetching, decoding/interpreting, executing, and writing back instructions.

The virtual network overlay 330 ("overlay 330") is typically established for a single service application, such as the service application that includes the endpoints A 211, B 385, C 212, and D 345, in order to promote and secure communication between the endpoints of the service application. Generally, the overlay 330 represents a layer of virtual IP addresses, instead of physical IP addresses, that virtually represents the endpoints of the service application and connects the virtual representations. In other embodiments, the overlay 330 is a virtual network built on top of the physical network 380 that includes the resources allocated to the customer controlling the service application. In operation, the overlay 330 maintains one or more logical associations of the interconnected end points A 211, B 385, C 212, and D 345 and may enforce the access control/security associated with the end points A 211, B 385, C 212, and D 345 in order to achieve physical network reachability (e.g., using a physical transport).

Figure 4:
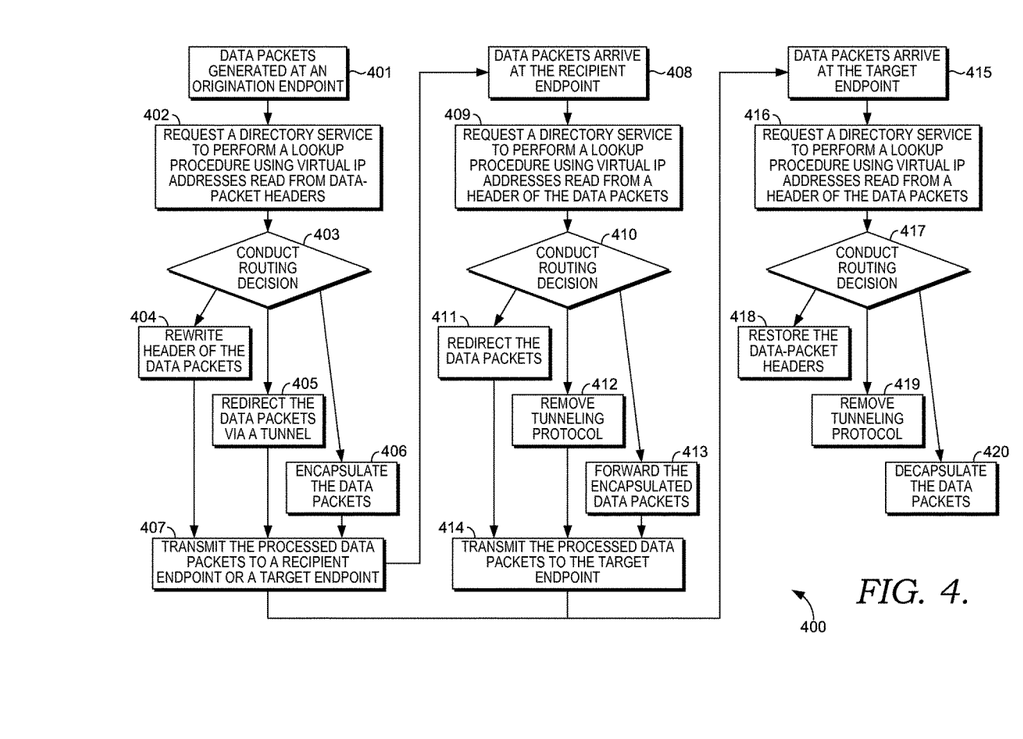
FIG. 4 is a schematic depiction of an exemplary decision tree for applying routing information distributed from a directory service to a routing decision, in accordance with an embodiment of the present invention.

Referring now to FIGS. 3 and 4, various possible routing decisions will now be described. In particular, FIG. 4 shows a schematic depiction of an exemplary decision tree 400 for applying routing information distributed from the directory service 220 to a routing decision, in accordance with an embodiment of the present invention. As discussed above, a driver may perform a routing decision based, in part, on whether a subject endpoint linked to the driver represents an origination endpoint of the data packets, a recipient endpoint that acts to forward the data packets onto a target endpoint, or the target endpoint. In a first instance, when the subject endpoint represents the origination endpoint (e.g., endpoint C 212), the driver associated with the origination endpoint may detect the origination endpoint attempting to transmit one or more data packets generated therefrom, as depicted at block 401. The driver may then solicit the directory service 220 to perform a lookup procedure by sending a request comprising indicia of a source IP address that points to the subject endpoint, and a destination IP address, as depicted at block 402.

The routing decision is carried out based on, in part, routing information transferred to the driver from the directory service 220, as depicted at block 403. The routing decision may result in, but is not limited to, one or more of the following transformation actions: rewriting the header of the data packets to include the location-dependent addresses (see block 404); configuring the data packets with a tunneling protocol and redirecting the data packets via a secure tunnel (see block 405); or encapsulating the data packets as inner data packets within respective outer data packets (see block 406), where the outer data packets each include a header that carries the location-dependent addresses.

In an exemplary embodiment, upon the driver determining that the origination endpoint and the target endpoint both reside within a common data center or subnet, the routing may result in the transformation action of rewriting the source IP address and the destination IP address with respective location-dependent addresses. However, when the driver determines that recipient endpoint or the target endpoint is unable to translate the headers of data packets if the source IP address and the destination IP address are removed (e.g., the recipient/target endpoint is in a data center or subnet that differs from the data center or subnet in which the origination endpoint resides), the routing decision may result in encapsulating the data packets as inner data packets within respective outer data packets in order to preserve the source and destination IP addresses within a payload of the data packets. In this embodiment immediately above, the driver may also recognize that a network pathway between the endpoints is substantially protected enough to satisfy the security policies of a governing service model. In contrast, when the driver recognizes that the network pathway connecting one or more of the endpoints lacks a level of protection or secure connectivity that is dictated by the governing service model, the routing decision may result in the transformation action of transforming the data packets to include secure tunneling protocol, thereby attempting to avoid interception of the data packets by nefarious actors.

Upon executing the routing decision, the origination endpoint may commence transmitting the processed data packets to either a recipient endpoint (e.g., endpoints A 211 or D 345) or a target endpoint (e.g., endpoint B 385), as depicted at block 407. Although, the recipient endpoint is described herein as a single network hop, it will be appreciated and understood that there may be more than one intermediate hop in the network, which would allow the recipient endpoint to be able to forward to another one or more recipient endpoints. In a second instance, when the subject endpoint represents the recipient endpoint, the driver associated with the recipient endpoint may detect the processed data packets arriving thereto, as depicted at block 408. The driver may then solicit the directory service 220 to perform a lookup procedure by sending a request comprising indicia of the source IP address and the destination IP address, as depicted at block 409.

The routing decision is carried out based on, in part, routing information transferred to the driver from the directory service 220, as depicted at block 410. The routing decision may result in one or more of the following transformation actions: redirecting the encapsulated data packets or data packets with the rewritten header through a tunnel 350 (see block 411) (e.g., see endpoint D 345); removing the tunneling protocol from the data packets (see block 412); or forwarding the encapsulated data packets or data packets with the rewritten header over another network pathway (see block 413) (e.g., see endpoint A 211). Again, the routing decision of whether to invoke the transformation action of forwarding the data packets over a network pathway or the transformation action of redirecting the data packets via a tunnel involves identifying that the endpoints are linked over secure connections or linked over connections that span unprotected networks (e.g., Internet), respectively.

Upon executing the routing decision, the recipient endpoint may commence transmitting the processed data packets to the target endpoint (e.g., endpoint B 385), as depicted at block 414. In a third instance, when the subject endpoint represents the target endpoint, the driver associated with the target endpoint may detect the processed data packets arriving thereto, as depicted at block 415. The driver may then solicit the directory service 220 to perform a lookup procedure by sending a request comprising indicia of the source IP address and the destination IP address pointing to the target endpoint, as depicted at block 416.

The routing decision is carried out based on, in part, routing information transferred to the driver from the directory service 220, as depicted at block 417. When the subject endpoint represents the target endpoint, the routing decision may result in one or more of the following transformation actions: restoring the headers of data packets that were rewritten (see block 418); removing the tunneling protocol from the data packets to prepare for consumption (see block 419); or decapsulating the encapsulated data packets (see block 420).

Figure 5:
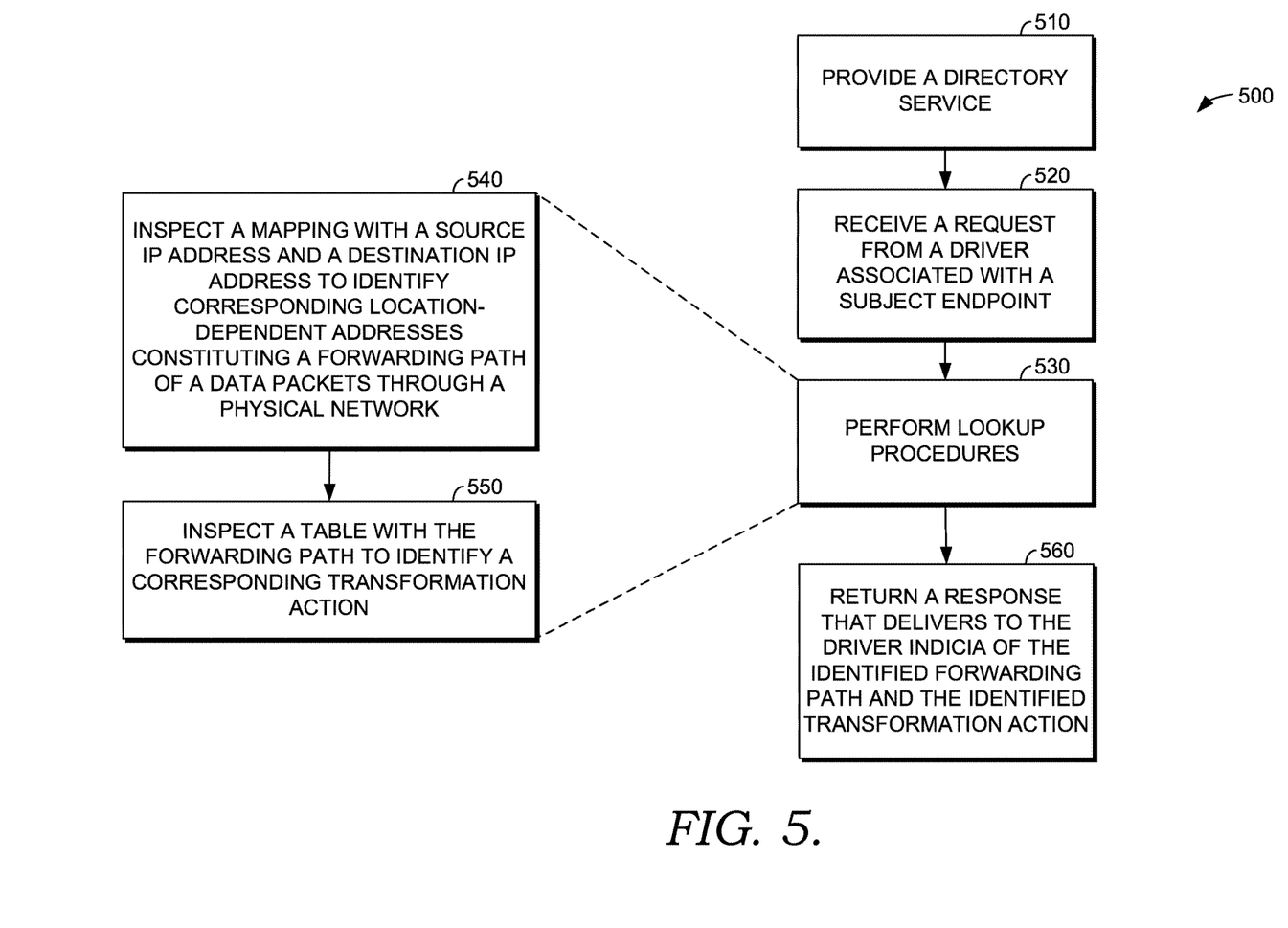
FIG. 5 is a flow diagram showing a method for identifying the appropriate physical-network pathway and transformation action in response to a request from the driver, in accordance with an embodiment of the present invention.

Turning now to FIG. 5, a flow diagram is illustrated that shows a method 500 for identifying the appropriate physical-network pathway and transformation action in response to a request from the driver, in accordance with an embodiment of the present invention. As may be gleaned from the discussion above, the steps of the method 500 are written from the perspective of the directory service 220 of FIGS. 2 and 3. Initially, the method 500 involves providing the directory service that maintains a mapping between virtual IP addresses and location-dependent addresses, as depicted at block 510. The directory service may also maintain a table that recognizes an appropriate transformation action. In one instance, the table is designed according to communication policies that govern data-packet traffic across pathways that connect endpoints within a network. In another instance, the table is based upon a service model (e.g., service level agreement (SLA)) established for a customer of a data center hosting the customer's service application.

The method 500 may further involve the step of receiving a request from a virtual network gateway, or driver, that is associated with, or established for locally communicating with, a subject endpoint, as depicted at block 520. Typically, the request includes indicia of a source IP address and a destination IP address carried via a header of one or more data packets accepted by the recipient endpoint. Upon receipt of the request, the directory service may perform the following lookup procedures (see block 530): inspect the mapping with the source IP address and the destination IP address to identify corresponding location-dependent addresses constituting a forwarding path of the data packets through a physical network (see block 540); and/or inspect the table with the forwarding path to identify a corresponding transformation action (see block 550). The transformation action may involve, but is not limited to, one or more of the following: rewriting the header of the data packets to include the location-dependent addresses; restoring the rewriting; encapsulating the data packets as inner data packets within respective outer data packets, which each include a header that carries the location-dependent addresses; decapsulating the encapsulated data packets; configuring the data packets with a tunneling protocol; or removing the tunneling protocol. As depicted at block 560, the directory service may return a response that delivers to the virtual network gateway indicia of the identified forwarding path and the identified transformation action.

Embodiments of the present invention have been described in relation to particular embodiments, which are intended in all respects to be illustrative rather than restrictive. Alternative embodiments will become apparent to those of ordinary skill in the art to which embodiments of the present invention pertain without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. One or more computer-storage media hardware devices having computer-executable instructions embodied thereon, when executed using one or more processors, perform a method for managing distribution of data packets between endpoints, the method comprising:
   reading at a first endpoint one or more data packets, wherein the one or more data packets include a header comprising a source IP address and a destination IP address;
   sending a request from the first endpoint to a directory service, wherein the request includes the source IP address and the destination IP address, and wherein the directory service uses a predefined mapping to identify location-dependent addresses corresponding to the source IP address and the destination IP address, wherein the location-dependent addresses are utilized in determining a forwarding path between the first endpoint and a second endpoint:
   receiving from the directory service a response that includes the forwarding path and a transformation action, wherein the transformation action is selected based on the specific forwarding path in that,
   when an origination endpoint and a target endpoint of the forwarding path reside within a subnet, the transformation action comprises rewriting the source IP address and the destination IP address with respective location-dependent addresses, and
   when a recipient endpoint or the target endpoint of the forwarding path reside in different subnets, the transformation action comprises encapsulating the data packets as inner data packets within respective outer data packets, and
   when a network path connecting one or more endpoints of the forwarding path lacks a level of protection, the transformation action comprises transforming the data packets to include secure tunneling protocol; and
   initiating transmission of the one or more data packets to the second endpoint along the forwarding path.

2. The computer-storage media of claim 1, wherein a driver is embodied on a node hosting the first endpoint and is responsible for delivering the request to the directory service and for receiving the response from the directory service.

3. The computer-storage media of claim 2, wherein the driver includes a routing component using a processor and a memory, the memory coupled to the processor configured for providing computer program instructions to the processor, to accept the one or more data packets and read the source address and the destination address from the header of the one or more data packets.

4. The computer-storage media of claim 1, wherein the predefined mapping associates virtual IP addresses and corresponding location-dependent addresses, the predefined mapping is used to identify a first location-dependent address that corresponds with the source IP address and a second location-dependent address that corresponds with the destination IP address.

5. The computer-storage media of claim 1, wherein the forwarding path represents a pathway within the physical network that links the first and second endpoints.

6. The computer-storage media of claim 1, wherein the directory service is further configured to maintain a table list a plurality of transformation actions.

7. The computer-storage media of claim 1, wherein the method further comprises the directory service inspecting the table with the forwarding path to identify a corresponding transformation action of the plurality of transformation actions.

8. The computer-storage media of claim 7, wherein the method further comprises receiving from the directory service a communication that includes the identified transformation action.

9. The computer-storage media of claim 8, wherein the method further comprises transforming the one or more data packets based on the received transformation action.

10. The computer-storage media of claim 9, wherein transforming the one or more data packets comprises readdressing the one or more data packets based on, the forwarding path.

11. The computer-storage media of claim 10, wherein the first endpoint represents an endpoint that originated the one or more data packets, and wherein the second endpoint represents an endpoint that is targeted by a header of the one or more readdressed data packets.

12. The computer-storage media of claim 10, wherein the first endpoint represents a network adapter running on a physical machine or a virtual machine (VM) that originated the one or more data packets.

13. The computer-storage media of claim 10, wherein the second endpoint represents a network adapter running on a physical machine or a virtual machine VM that is targeted by a header of the one or more readdressed data packets.

14. The computer-storage media of claim 10, wherein readdressing the one or more data packets based on the forwarding path comprises:
   removing the source IP address and the destination IP address within the header of the one or more data packets; and
   replacing the source IP address and destination IP address with a first and second location-dependent addresses, respectively, of a physical network.

15. The computer-storage media of claim 14, wherein replacing the source IP address and destination IP address occurs upon identifying that the first endpoint and the second endpoint reside within a common data center and upon identifying that the source IP address and the destination IP address belong to a common virtual space.

16. The computer-storage media of claim 9, wherein transforming the one or more data packets comprises encapsulating the one or more data packets as inner data packets within respective outer data packets, wherein the outer data packets each include a header that comprises the first and second location-dependent addresses.

17. The one or more computer-readable media of claim 16, wherein encapsulating the one or more data packets occurs upon determining that the second endpoint is unable to translate the headers of the one or more data packets if the source IP address and the destination IP address are removed.

18. A computer system for supporting and isolating communications between endpoints, the computer system comprising:
- a processor and a memory coupled to the processor configured for providing computer program instructions to the processor;
- a directory service that maintains a mapping between virtual internet protocol (IP) addresses and location-dependent addresses of a physical network;
- a first endpoint that originates one or more data packets structured with headers that include a source IP address and a destination IP address, wherein the source IP address points to the first endpoint, and wherein the destination IP address points to a second endpoint; and
- a driver that performs a routing decision comprising:
- communicating with the directory service to determine a forwarding path and a transformation action as a function of, at least, the source IP address and the destination IP address, wherein the transformation action is selected based on the specific forwarding path, in that,
- when an origination endpoint and a target endpoint of the forwarding path reside within a subnet, the transformation action comprises rewriting the source IP address and the destination IP address with respective location-dependent addresses, and
- when a recipient endpoint or the target endpoint of the forwarding path reside in different subnets, the transformation action comprises encapsulating the data packets as inner data packets within respective outer data packets, and
- when a network path connecting one or more endpoints of the forwarding path lacks a level of protection, the transformation action comprises transforming the data packets to include secure tunneling protocol.

19. The computer system of claim 18, wherein the directory service maintains a table that imparts the appropriate transformation action to the driver based on a record of pre-established tunnels or network pathways that link the first endpoint and the second endpoint.

20. A computerized method for identifying network pathways and transformation actions in response to requests from a distributed, virtual network gateway, the method comprising:
- providing a directory service that maintains a mapping between virtual internet protocol (IP) addresses and location-dependent addresses, and maintains a table that returns an appropriate transformation action upon being queried with one or more IP addresses;
- receiving a request from a virtual network gateway in communication with a recipient endpoint, wherein the request includes indicia of a source IP address and a destination IP address carried by one or more data packets accepted by the recipient endpoint;
- using the mapping to identify location-dependent addresses corresponding to the source IP address and the destination IP address, wherein the location-dependent addresses are utilized in determining a forwarding path of the one or more data packets through a physical network;
- using the table to identify a corresponding transformation action corresponding to the forwarding path, wherein the transformation action is selected based on the specific forwarding path, in that,
- when an origination endpoint and a target endpoint of the forwarding path reside within a subnet, the transformation action comprises rewriting the source IP address and the destination IP address with respective location-dependent addresses, and
- when the recipient endpoint or the target endpoint of the forwarding path reside in different subnets, the transformation action comprises encapsulating the data packets as inner data packets within respective outer data packets, and
- when a network path connecting one or more endpoints of the forwarding path lacks a level of protection, the transformation action comprises transforming the data packets to include secure tunneling protocol; and
- returning a response that delivers to the virtual network gateway indicia of the forwarding path and the identified transformation action, wherein the virtual network gateway communicates the response to the recipient endpoint.

* * * * *